May 1, 1956
D. N. JUDELSON
2,743,776
BIAS-CUTTING MACHINE
Filed June 13, 1955
FIG. 2.
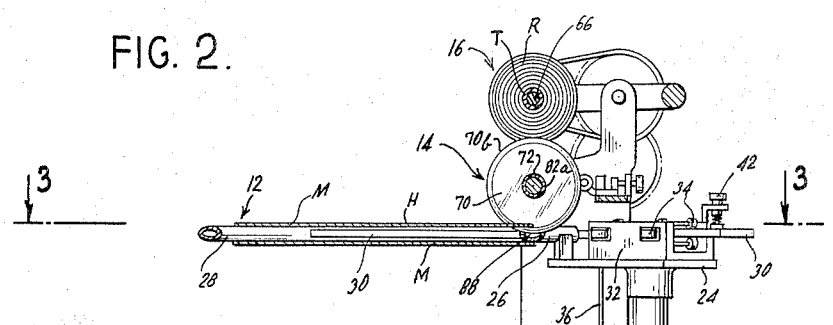
FIG. 1.
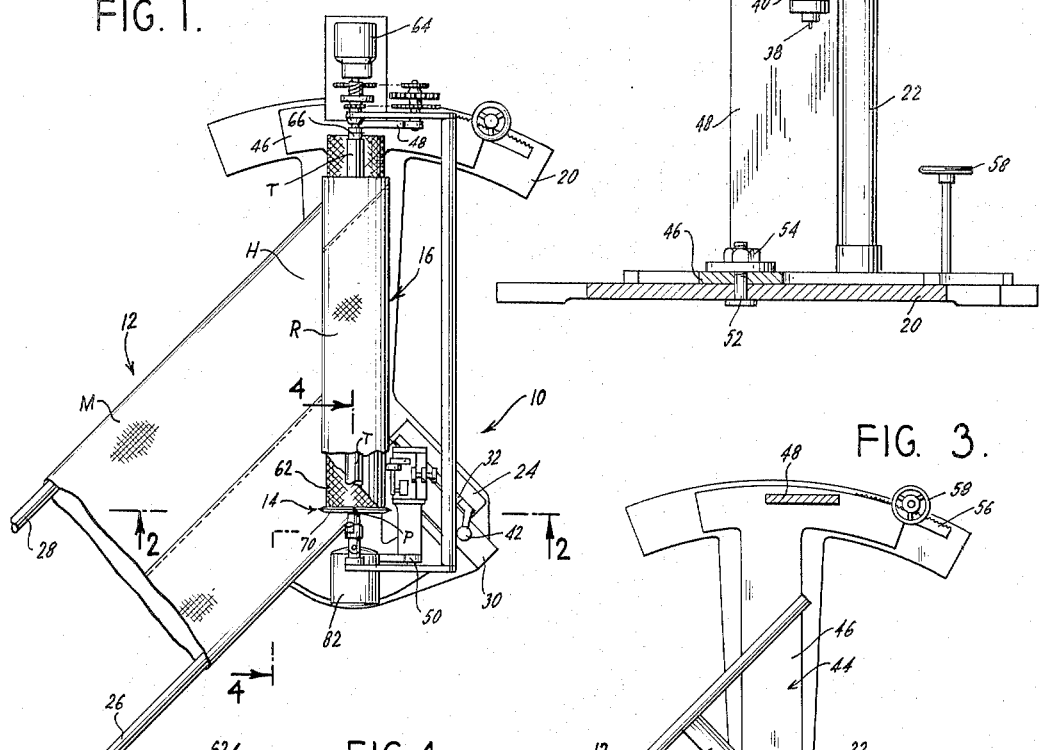
FIG. 3.
FIG. 4.
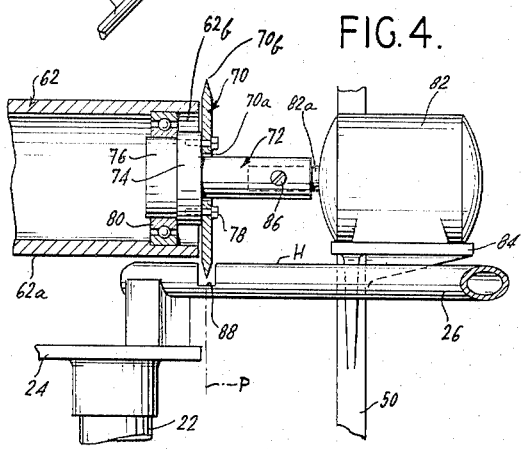
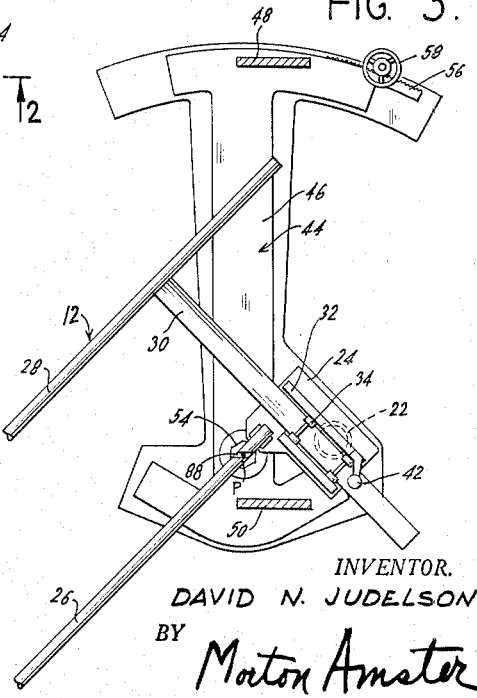
INVENTOR.
DAVID N. JUDELSON
BY Morton Amster
ATTORNEY United States Patent Office 2,743,776
Patented May 1, 1956

2,743,776

BIAS-CUTTING MACHINE

David N. Judelson, New York, N. Y.

Application June 13, 1955, Serial No. 515,134

14 Claims. (Cl. 164—61)

The present invention relates to a machine for cutting tubular material, and in particular to apparatus for bias cutting a tube of material. This is a continuation-in-part of application Serial No. 446,374, filed July 28, 1954, and entitled Bias-Cutting Machine and Methods.

Numerous machines are known for cutting material from a seamed or seamless tube into material cut on the bias. Broadly, such machines include a mandrel over which the tube of material is drawn in a spiraling path past a rotary cutting knife; pulling mechanisms disposed at an angle to the axis of the mandrel and operative to advance the tube of material past the cutting knife, the pulling mechanisms serving as the windup for receiving the continuous length of bias cut goods; and feed means for delivery of the seamed tube to the leading end of the mandrel, the feed means taking the form of either a turnbuckle for receiving the goods in roll form or a container for receiving the goods in loosely folded condition.

Broadly, it is an object of the present invention to provide an improved bias-cutting machine of the aforesaid general construction.

Known machines further incorporate provision for the adjustability of the takeoff or windup mechanisms relative to the mandrel and the rotary cutting knife, such that the degree of biasing maybe varied under control of the operator and within prescribed limits. The bias cut material may be of a "full bias," that is with the weave at an angle of approximately 45° with respect to the cut edge of the bias cut material; the bias cut material may be of an "under bias," that is with the weave at an angle of less than 45° with respect to the cut edge of the bias cut material; and the bias cut material may be of an "over bias," that is with the weave at an angle in excess of 45° with respect to the cut edge of the material. Such known machines incorporate windup mechanisms which are pivoted at the end removed from the cutting knife for movement toward and away from the mandrel to define varying angles of under and over bias between the windup axis and the longitudinal center axis of the mandrel. The pivot for the windup mechanisms is usually disposed along the longitudinal center axis of the mandrel with the windup mechanisms extending outwardly from the mandrel. In various positions of adjustment, the windup mechanisms receive the bias cut goods or material after the same has traveled free and unsupported from the location along or about the mandrel at which the goods emerges with a bias cut to the location at which the bias cut goods is picked up by the windup mechanisms. Necessarily such free and unsupported travel of the bias cut goods causes changes in the bias from the true or theoretical bias as established by the angle between the windup axis and the longitudinal center axis of the mandrel. The degree of distortion of the bias cut goods, which in some instances may take the form of neckdown of the goods, depends upon many variables including the type of goods being worked. For soft and easily stretched materials, extreme distortions may be experienced, and for hard and relatively stiff materials, the problem of distortion may be less pronounced.

Accordingly, it is a further object of the present invention to provide a bias-cutting machine capable of producing bias cut material which is substantially distortion-free and in which the amount of bias is substantially of the theoretical amount as predetermined by the angle between the windup mechanisms and the linear feed path of the material along the mandrel.

It is a still further object of the present invention to provide an adjustable angle bias-cutting machine specifically designed to produce goods at full bias and varying angles of under bias. To advantage, a machine designed according to principles of the present invention for bias cutting at 45° and at lesser angles provides substantial stretch and distortion-free windup of the bias cut goods.

In accordance with an illustrative embodiment demonstrating features of the present invention, there is provided a bias-cutting machine which includes a relatively flat mandrel, a cutter disposed at one side of and angularly of the mandrel and rotatable about a first axis, and windup mechanisms for pulling a tube of material over the relatively flat mandrel. The windup mechanisms include a roller journaled for rotation about a second axis in end-to-end alignment with the first axis, the second axis being disposed relative to the mandrel such that the lowermost peripheral portion of the roller lies substantially in the plane of the mandrel. By this arrangement as the bias cut goods emerges from the mandrel along a theoretical line of demarcation, the goods is immediately supported by the roller of the windup mechanisms; thus, the roller tends to pull the straight material in tubular form along and about the mandrel, yet feeds bias cut material to the windup mechanisms.

As a further feature of the invention, the assembly of the cutter and the windup mechanisms are mounted for angular adjustment relative to the mandrel for obtaining various underbiased conditions by provision of a pivot at the end of the windup mechanisms adjacent the cutter. In the illustrative embodiment, the pivot provides a turning axis lying substantially in the plane of the cutter and intersecting the coinciding or aligned first and second axes. By turning the assembly of the cutting knife and the windup mechanisms, varying underbias angles may be obtained in accordance with operational requirements.

Still further objects, features and advantages of the present invention, will be best appreciated by reference to the following detailed description of a presently preferred illustrative embodiment of the invention, when taken in conjunction with the accompanying drawings, wherein:

Fig. 1 is a plan view, with parts broken away, of the mandrel and windup mechanisms of a bias-cutting machine embodying features of the present invention;

Fig. 2 is a sectional view taken substantially along the line 2—2 of Fig. 1 and looking in the direction of the arrows;

Fig. 3 is a sectional view taken substantially along the line 3—3 of Fig. 2 and looking in the direction of the arrows; and, Fig. 4 is a fragmentary sectional view taken substantially along the line 4—4 of Fig. 1 and looking in the direction of the arrows.

Referring now specifically to the drawings, and particularly to Fig. 1, there is shown part of a bias-cutting machine according to my mentioned copending application, but modified to illustrate principles of the present invention. The machine, generally designated by the reference numeral 10 includes an elongated relatively flat mandrel 12 (illustrated with its leading end broken away), material delivery or presenting apparatus (not shown) adjacent the leading or forward end of the mandrel 12, which may take the form of either a turnbuckle or rotatable inclined container, a cutter 14 at one side of and adjacent the trailing or rear end of the mandrel 12, and an angularly disposed windup or takeup mechanism 16 extending generally across the mandrel 12. As detailed in my copending application, the delivery or presenting mechanisms are arranged to rotationally orient the material M which is in seamed tubular form for feed to the mandrel 12. The takeoff or windup mechanisms 16 wind the bias cut material in the form of a roll R and advance the tube M in a spiraling direction past the cutter 14. As is well understood, the longitudinal feed rate of the goods over the mandrel 12 is determined by the pull exerted by the windup mechanism 16 and the angular location of the pulling axis relative to the longitudinal center line or medial axis of the mandrel 12. The material M is formed into tubular configuration by known mechanisms, for example, by seaming into a tube, or by weaving into the form of a tube.

The machine includes a main base plate 20 which is stationary and supports an upright or post 22 carrying a bracket or auxiliary supporting frame 24 adjacent its upper end. Mounted on the supporting frame 24 is a stationary side bar 26, which defines one lateral limit or side of the mandrel 12. Arranged in substantial parallelism with the stationary side bar 26 is an adjustable side bar 28 which is movable toward and away from the stationary side bar 26. The adjustable side bar 28 is carried on a cantilever support including a cross bar or a beam 30 extending over the auxiliary frame 24 into an appropriate slide block 32 having rolling contact with appropriate ball bearings or rollers 34 which engage the upper, lower and side faces of the cantilever-supported cross bar 30. Operatively connected to the end of the cross bar or cantilever support 30 is an adjustable dynamic loading or tensioning system including a chain 36 having a hanger 38 to receive weights 40 (see Fig. 2). This system urges the adjustable side bar 28 away from the fixed or stationary side bar 26. In association with the adjustable dynamic tensioning, there is provided a static-biasing system 42 for applying drag to the movable side bar. A loading differential is applied to the adjustable side bar in accordance with the principles fully detailed in my mentioned copending application.

Since the mandrel is seen to be of relatively flat cross-section, the material M fed thereover is formed of a relatively flat tube with upper and lower faces substantially in parallelism and supported only by curved portions wrapped around the respective side bars 26, 28.

The cutter assembly 14 and the windup or takeup mechanisms 16 are supported on a frame 44 including an auxiliary base plate 46 and upwardly extending side members 48, 50. The auxiliary base plate 46 is pivotally supported on the main base plate 20 by means of a nut and bolt assembly 52, 54. The entire windup mechanism 16 and the associated cutter 14 is turnable about the vertical axis P which coincides with the upstanding pivot bolt 52. The vertical axis P lies in the plane of the cutter 14 and intersects the coinciding cutting and pulling axes, as will appear hereinafter.

Appropriate means are provided for manually turning the auxiliary frame or support 44 about the vertical axis P. In the illustrative form of the invention, such means include a lockable rack and pinion arrangement including a rack 56 secured to the auxiliary base plate 46, a pinion (not shown) journaled on the main base plate 20, and an appropriate hand wheel 58 operatively connected to the pinion which is in meshing engagement with the rack 56. Upon rotating the pinion, various angular adjustments are obtained for the assembly of the cutter 14 and windup mechanisms 16 in relation to the mandrel 12.

Insofar as the details of the windup mechanisms 16 are pertinent to the present disclosure, such mechanisms will be described. However, for a detailed description of the windup mechanisms including the operation of the drive and the adjustments for roll tightness, reference may be made to my copending application.

As seen in Figs. 1 and 2, a horizontally extending combined puling, driving and windup feed roller 62 is journaled at one end on appropriate framing secured to the upright or side member 48 for rotation about a pulling axis. The pulling roller 62 is of relatively large diameter and is knurled on its outer surface to assure adequate gripping of the bias cut material. As seen in Fig. 4, the lower peripheral pickup line 62a of the pulling roller 62 lies substantially in the horizontal plane H of the upper face of the adjustable-width mandrel 12. The windup roller is supported adjacent the end remote from the knife 14 on an appropriate stub shaft which is driven from the motor 64 via couplings and a gear reduction mechanism.

Mounted above the pulling roller 62 is a windup shaft 66 which is supported on a pivoted and counterbalanced frame 68. The windup shaft 66 is adapted to receive a windup tube T, as of cardboard or the like, upon which the biased material R is rolled after windup. An appropriate drive including a slip clutch is operatively connected to the windup shaft 66 such that constant speed windup may be obtained in conjunction with the main driving or pulling roller 62. In that the details of the drive for the windup shaft are exactly the same as disclosed in my copending application, further description is dispensed with.

Turning now to the details of the cutter assembly 14, as illustrated best in Fig. 4, there is provided the flat circular cutting knife or blade 70 supported on a shaft 72 having stepped collars 74, 76. The circular cutting knife 70 has a central opening 70a substantially of the diameter of the supporting shaft 72 so that the knife may be slipped over the shaft 72 and brought into the supported position bearing against the adjacent face of the larger-diameter collar 74. Appropriate removable bolts 78 are tapped into the collar 74 for releasably securing the knife or blade 70 in position across and bridging the adjacent open end 62b of the pulling roller 62. The smaller diameter collar 76 is secured to the inner raceway of a ball bearing 80 which has its outer raceway fixed to the inner periphery of the roller 62.

Operatively connected to the supporting shaft 72 is the output shaft 82a of a motor 82 which is removably mounted on an appropriate bracket 84 fixed to or formed integrally with the side member 50 of the turnable frame 44. The motor shaft 82a is coupled to the supporting shaft 72 by provision of an appropriate socket axially of the shaft 72 which accomodates the end of the output shaft 82a, the respective shafts being interconnected through provision of a bolt 86. As seen in Fig. 4, the cutting edge 70b of the knife 70 extends beyond the periphery of the pulling roller 62 and into an angularly disposed slot 88 formed in the fixed side bar 26 of the mandrel 12. Thus, it will be appreciated that the cutting knife is effective in the plane H to sever material passing along and about the mandrel 12.

The described arrangement of the pulling roller 62 and of the cutting knife 70 is such that the assembly of the cutting knife (which is driven at the cutting speed by the motor 82) and the pulling roller 62 (which is driven at the takeup speed) is adjustable in unison about the turning axis P. The collar 76 which is journaled in the bearing 80 is effective to maintain coincidence or alignment between the axis of the pulling roller 62 and the axis of the rotary cutting knife 70. The width of the slot 88 in the fixed side bar 26 is selected such that for various positions of angular adjustment the rotary cutting knife 70 may turn without binding or contact with the side bar to be effective in the plane H for severing the tube of material M as it passes through the cutting zone.

A typical sequence of operation will now be described in detail, together with various adjustments that can be made for different biasing conditions:

At the outset, material is delivered from the delivery apparatus (not shown, but illustrated in detail in my copending application), and is passed over the mandrel, pulled past the cutting knife 70, wrapped around the pulling roller 62, and secured to the tube T on the windup shaft 66. Thereafter, operation is in accordance with the principles outlined in my copending application, it being specifically observed that the material M as it emerges along the line of demarcation which divides the region where the material is in tube form and where the material is bias cut, is immediately supported at the lowermost peripheral pickup point or portion 62a of the roller 62. Effectively, the roller 62 pulls straight material M, yet feeds bias cut material to the windup mechanisms. Thus, there is no opportunity for stretch or distortion in that the goods after being bias cut is immediately supported by peripheral portions of the windup roller 62.

For adjustment to underbiasing the goods with respect to the full bias or the 45° position of the windup, the hand wheel 58 is turned in the direction appropriate to turn the frame 44 supporting the windup mechanisms 16 and the cutter 14 clockwise about the pivotal axis P, as viewed in Fig. 1. In each position of adjustment, the pulling roller 62a will have its lowermost peripheral pickup point or portion 62a along the common line of corresponding opposite edge portions of the bias cut material; that is, the edge portion of the material M, which corresponds to the edge immediately under the cutter 70 will lie along the theoretical line of demarcation between the region of straight goods and bias cut goods, and the peripheral pickup line 62a of the roller 62 will coincide with this line of demarcation. Thus, the pulling roller will tend to pull straight material, yet feed biased material for various positions under the full or 45° bias.

The instant machine is not designed to provide for angular adjustments in excess of 45° bias or full bias, that is for overbiased conditions. Upon inspection of Fig. 1, it will be appreciated that if the assembly of the cutter 14 and the windup mechanism 16 is turned in the counter-clockwise direction from the illustrated 45° position corresponding to full bias, the end portion of the roller which is to receive the bias cut goods from the side of the mandrel remote from the knife will lie outwardly of the adjustable side bar 12. For such overbias angles, the bias cut goods would tend to fall back upon itself after leaving the mandrel 12 and proper winding cannot be expected.

For removal of the knife 70 for sharpening or replacement, it is merely necessary to disconnect the motor shaft 82a from the cutter-supporting shaft 72 and release the bolts 78 whereupon the cutter may be removed from its supported position.

Numerous modifications of the apparatus of the present invention will occur to those skilled in the art, and accordingly the appended claims should be given a latitude of interpretation consistent with the instant disclosure; at certain times certain features of the invention will be used without a corresponding use of other features.

What I claim is:

1. A bias-cutting machine comprising a relatively flat mandrel, a cutter disposed at one side and angularly of said mandrel and rotatable about a first axis, and windup mechanisms for pulling a tube of material over said relatively flat mandrel, said windup mechanisms including a roller journaled for rotation about a second axis in end to end alignment with said first axis, said second axis being disposed relative to said mandrel such that the lowermost peripheral portion of said roller lies substantially in the plane of said mandrel, and a movable windup shaft extending parallel to said axis at a location circumferentially spaced from said lowermost peripheral portion of said roller.

2. A bias-cutting machine comprising a relatively flat mandrel, a cutter rotatable about an axis and disposed at one side and angularly of said mandrel, and windup mechanisms for pulling a tube of material over said relatively flat mandrel and past said cutter, said windup mechanisms including a pulling roller journaled for rotation about an axis spaced above said mandrel and in end to end alignment with the axis of said cutter.

3. A bias-cutting machine comprising a relatively flat mandrel having an upper face, a circular cutter disposed at one side of and angularly of said mandrel and rotatable about a first axis, said circular cutter having a cutting edge effective in the plane of said upper face for severing goods passing over and around said mandrel, and windup mechanisms for pulling the goods over said relatively flat mandrel, said windup mechanisms including a roller journaled for rotation about a second axis in end to end alignment with said first axis, said second axis being disposed relative to said mandrel such that the lowermost peripheral pickup line of said roller lies substantially in the plane of said upper face of said mandrel.

4. A bias-cutting machine comprising a relatively flat mandrel, an upstanding cutter rotatable about an axis and disposed at one side and angularly of said mandrel, windup mechanisms for pulling a tube of material over said relatively flat mandrel and past said cutter, said windup mechanisms including a pulling roller journaled for rotation about an axis aligned with the axis of said cutter, the assembly of said upstanding cutter and said pulling roller extending from side to side of said mandrel, and means operatively connected to said cutter and engaged within said pulling roller for supporting said cutter with its axis in alignment with the axis of said pulling roller.

5. In a bias-cutting machine, a mandrel over which material passes under substantially constant tension, a rotary cutting knife arranged angularly of said mandrel adjacent one side and end thereof, a windup mechanism for the bias cut material extending substantially across said mandrel at said one end, said windup mechanism including a pulling roller journaled for rotation about an axis substantially coinciding with the axis of said rotary cutting knife, and means including a pivot at the end of said windup mechanism adjacent said rotary cutting knife for angular adjustment relative to said mandrel.

6. In a bias-cutting machine, an elongated relatively flat mandrel having a longitudinal center line and over which a tube of material passes under substantially constant tension, a knife arranged angularly of said mandrel at one side thereof for bias cutting said tube of material, a windup mechanism arranged at an angle relative to said mandrel and including a pulling roller extending substantially across said mandrel, said pulling roller receiving bias cut material within prescribed lateral limits, and means including a pivot at the end of said pulling roller adjacent said knife mounting the assembly of said knife and said windup mechanism for angular adjustment relative to said mandrel through a selected range, said flat mandrel presenting substantially uniform drag from side to side to said pulling roller, the bias cut material coming from said mandrel along a line of demarcation substantially in the same vertical plane as the axis of said pulling roller, the longitudinal center line of said mandrel intersecting a plane through the axis of said pulling roller within said prescribed lateral limits.

7. In a bias cutting machine for a tube of material, an elongated flat mandrel having a longitudinal center line and substantially parallel upper and lower faces over which said tube passes under substantially constant tension, an upstanding cutting knife arranged angularly of said upper face of said mandrel and at one side thereof for bias cutting said tube, means mounting said cutting knife for rotation about an axis, and windup mechanisms extending substantially across said mandrel at one end thereof, opposite side edges of said material at the instant of cutting lying along a common line in substantially the plane of the upper face of said mandrel and presenting substantially equal drag to said windup mechanisms, said windup mechanisms being effective in the plane of said upper face and along said common line and exerting substantially uniform pull across the width of the bias-cut material, said windup mechanisms including a pulling roller extending substantially across said mandrel and having the lowermost peripheral pickup along said common line, said pulling roller receiving bias cut material within prescribed lateral limits, the longitudinal center line of said mandrel intersecting a plane through the axis of said pulling roller within said prescribed lateral limits, and means including a pivot adjacent the end of said pulling roller nearest said cutting knife mounting said cutting knife and windup mechanisms for angular adjustment in unison relative to said mandrel.

8. In a machine for bias cutting goods at an angle of forty-five degrees, a support, a relatively flat mandrel having a pair of side bars mounted on said support and extending in a horizontal plane, a pulling roller extending across said mandrel at an angle of forty-five degrees to said side bars and journaled for rotation about a pulling axis, and a cutting knife disposed adjacent one end of said pulling roller and journaled for rotation about a cutting axis coinciding with said pulling axis, the lowermost peripheral portion of said pulling roller lying substantially in said horizontal plane.

9. In a machine for bias cutting goods at full and under bias angles, a support, a relatively flat mandrel having a pair of side bars mounted on said support and extending in a horizontal plane, a pulling roller extending across said mandrel at an angle to said side bars and journaled for rotation about a pulling axis, an upstanding circular cutting knife disposed adjacent one end of said pulling roller and journaled for rotation about a cutting axis coinciding with said pulling axis, the lowermost peripheral portion of said pulling roller lying substantially in said horizontal plane, a common support for the assembly of said cutting knife and said pulling roller, and pivot means mounting said support for turning about a vertical axis lying on the plane of said cutting knife and intersecting the coinciding cutting and pulling axes.

10. In a bias cutting machine for a tube of material, an elongated horizontally extending flat mandrel having substantially parallel upper and lower faces over which said tube passes under substantially constant tension, an upstanding cutting knife arranged angularly of said upper face of said mandrel and at one side thereof for bias cutting said tube, means projecting from one face of said cutting knife and mounting said cutting knife for rotation about an axis, and windup mechanism extending substantially across said mandrel at one end thereof, opposite side edges of said material at the instant of bias cutting lying along a common line in substantially the plane of the upper face of said mandrel, said windup mechanisms being effective in the plane of said upper face and along said common line and exerting substantially uniform pull across the width of the bias-cut material, said windup mechanisms including a pulling roller extending substantially across said mandrel, means mounting said pulling roller for rotation about an axis coinciding with the axis of said cutting knife, said pulling roller having its lowermost peripheral pickup along said common line and having an open end adjacent said cutting knife, a bearing in said open end of said cutting knife, a guiding collar journaled within said bearing and operatively connected to the other face of said cutting knife for maintaining the axis of said cutting knife in coincidence with the axis of said pulling roller, and means including a pivot adjacent the end of said pulling roller nearest said cutting knife mounting said windup mechanisms for angular adjustment relative to said mandrel.

11. In a bias cutting machine for a tube of material, an elongated horizontally extending flat mandrel having substantially parallel upper and lower faces over which said tube passes under substantially constant tension, an upstanding cutting knife arranged angularly of said upper face of said mandrel and at one side thereof for bias cutting said tube, means projecting from one face of said cutting knife and mounting said cutting knife for rotation about an axis, and windup mechanisms extending substantially across said mandrel at one end thereof, opposite side edges of said material at the instant of bias cutting lying along a common line in substantially the plane of the upper face of said mandrel, said windup mechanisms being effective in the plane of said upper face and along said common line and exerting substantially uniform pull across the width of the bias-cut material, said windup mechanisms including a pulling roller extending substantially across said mandrel, means mounting said pulling roller for rotation about an axis coinciding with the axis of said cutting knife, said pulling roller having its lowermost peripheral pickup along said common line and having an open end adjacent said cutting knife, a bearing in said open end of said cutting knife, and a guiding collar journaled within said bearing and operatively connected to the other face of said cutting knife for maintaining the axis of said cutting knife in coincidence with the axis of said pulling roller.

12. A bias-cutting machine comprising a mandrel having a flat upper face, a cutter disposed at one side and angularly of said mandrel and effective to sever material during its passage over and around said mandrel, the severed material emerging in said flat upper face along a theoretical line of demarcation extending angularly of and across said mandrel, and windup mechanisms for pulling a tube of material over and around said mandrel, said windup mechanisms including a roller journaled for rotation about an axis in a common plane with said theoretical line at right angles to said flat upper face, said axis being disposed relative to said mandrel such that the lowermost peripheral portion of said roller lies substantially in the plane of said flat upper face of said mandrel, and a movable windup shaft extending parallel to said axis at a location circumferentially spaced from said lowermost peripheral portion of said roller.

13. A bias-cutting machine comprising a mandrel having a flat upper face, a cutter disposed at one side and angularly of said mandrel and effective to sever material during its passage over and around said mandrel, the severed material emerging in said flat upper face along a theoretical line of demarcation extending angularly of and across said mandrel and windup mechanisms for pulling a tube of material over and around said mandrel, said windup mechanisms including a roller journaled for rotation about an axis in a common plane with said theoretical line at right angles to said flat upper face, said axis being disposed relative to said mandrel such that the lowermost peripheral portion of said roller lies substantially in the plane of said flat upper face of said mandrel.

14. A bias-cutting machine comprising a mandrel having a relatively flat upper face, a cutter disposed at one side and angularly of said mandrel and effective to sever material whereby the severed material emerges as bias cut along a line extending angularly of and across said mandrel, and windup mechanisms for pulling a tube of material over said mandrel and past said cutter, said windup mechanisms including a pulling roller journaled for rotation about an axis spaced above said mandrel and in a common vertical plane with said line, said axis being spaced in relation to said upper face of said mandrel whereby the lowermost peripheral portion of said roller lies substantially in the plane of said flat upper face.

References Cited in the file of this patent

UNITED STATES PATENTS

| | | |
|---|---|---|
| 1,520,139 | Prior | Dec. 23, 1924 |
| 1,955,282 | Gardiner | Apr. 17, 1934 |
| 2,110,856 | Gardiner | Mar. 15, 1938 |
| 2,382,997 | Katz | Aug. 21, 1945 |
| 2,725,103 | Kagan | Nov. 29, 1955 |